US008606789B2

(12) United States Patent
Chidlovskii

(10) Patent No.: US 8,606,789 B2
(45) Date of Patent: Dec. 10, 2013

(54) METHOD FOR LAYOUT BASED DOCUMENT ZONE QUERYING

(75) Inventor: Boris Chidlovskii, Meylan (FR)

(73) Assignee: Xerox Corporation, Norwalk, CT (US)

( * ) Notice: Subject to any disclaimer, the term of this patent is extended or adjusted under 35 U.S.C. 154(b) by 298 days.

(21) Appl. No.: 12/829,553

(22) Filed: Jul. 2, 2010

(65) Prior Publication Data

US 2012/0005225 A1  Jan. 5, 2012

(51) Int. Cl.
*G06F 7/00* (2006.01)

(52) U.S. Cl.
USPC ........... 707/741; 707/766; 707/769; 707/771; 707/793; 706/18

(58) Field of Classification Search
None
See application file for complete search history.

(56) References Cited

U.S. PATENT DOCUMENTS

| | | | |
|---|---|---|---|
| 7,099,861 B2 | 8/2006 | Youn | |
| 7,475,061 B2 | 1/2009 | Bargeron et al. | |
| 7,613,995 B2* | 11/2009 | Wen et al. | 715/209 |
| 2004/0013302 A1* | 1/2004 | Ma et al. | 382/209 |
| 2004/0220898 A1* | 11/2004 | Eguchi et al. | 707/1 |
| 2006/0156226 A1 | 7/2006 | Déjean et al. | |
| 2006/0248070 A1 | 11/2006 | Déjean et al. | |
| 2007/0014467 A1* | 1/2007 | Bryll | 382/152 |
| 2008/0077847 A1 | 3/2008 | Déjean et al. | |
| 2008/0114757 A1 | 5/2008 | Déjean et al. | |
| 2009/0046918 A1 | 2/2009 | Déjean et al. | |

OTHER PUBLICATIONS

Nagy et al. "A prototype document image analysis system for technical journals," *Computer*, 7(25): 10-22 (1992).
Wong et al. "Document analysis system," *IBM Journal of Research and Development*, 26(6):647-656 (1982).
Datta, et al. "Image retrieval: Ideas, influences, and trends of the new age," ACM *Comput. Surv.*, 40(2):1-60 (2008).
Croxton, et al. "A Comparison of Mixed Integer Programming Models for Nonconvex Piecewise Linear Cost Minimization Problems," Manage. Science, 49(9), pp. 1268-1273 (2003).
van Beusekom, et al. "Distance Measures for Layout-Based Document Image Retrieval," Proceedings of the Second International Conference on Document Image Analysis for Libraries Apr. 27-28, 2006.
Janssen, et al. "UpLib: A Universal Personal Digital Library System," DocEng'03, Nov. 20-22, 2003.
Nakai, et al. "Camera-Based Document Image Retrieval as Voting for Partial Signatures of Projective Invariants," Eighth International Conference on Document Analysis and Recognition (ICDAR'05), Aug. 31-Sep. 1, 2005.
U.S. Appl. No. 12/556,098, Chidlovskii, et al.
U.S. Appl. No. 12/773,125, Déjean, et al.

* cited by examiner

*Primary Examiner* — Anh Tai Tran
(74) *Attorney, Agent, or Firm* — Fay Sharpe LLP

(57) ABSTRACT

A method and a system are disclosed for querying a document collection based on the layout of only a fragment of the content of a document, specified as a query zone. The method includes providing an index for a collection of documents. In the index, content of a document page in the collection that has been decomposed into layout blocks is indexed according to representations of the blocks and one or more geometric relations between the blocks. A query is generated which is based on representations of blocks determined to be within the query zone and geometric relations between them. This is used to query the index to retrieve pages of documents in the collection which can each be expected to include a layout zone somewhere in the page that is similar in layout to the query zone.

25 Claims, 9 Drawing Sheets

METHOD FOR LAYOUT BASED DOCUMENT ZONE QUERYING

CROSS REFERENCE TO RELATED PATENTS AND APPLICATIONS

The following reference, the disclosures of which are incorporated herein in their entireties, by reference, are mentioned:

U.S. application Ser. No. 12/556,098, filed Sep. 9, 2009, entitled SCALABLE INDEXING FOR LAYOUT BASED DOCUMENT RETRIEVAL AND RANKING, by Boris Chidlovskii, et al.

U.S. application Ser. No. 12/773,125, filed May 4, 2010, entitled SYSTEM AND METHOD FOR UNSUPERVISED GENERATION OF PAGE TEMPLATES, by Hervé Déjean, et al.

BACKGROUND

The exemplary embodiment relates to indexing and querying of documents. It finds particular application in connection with querying databases of documents based on document layout, and will be described with particular reference thereto.

Much information is now available in electronic format and stored in personal, intranet, and internet document collections. Over the last twenty years, significant progress has been achieved in the area of full text indexing and retrieval. Current techniques of information retrieval allow a user to query document collections with one or multiple keywords and retrieve and rank the relevant documents. In the case of documents available on the World Wide Web (Web), search engines crawl the Web and index Web pages as well as PDF and Word documents. For all document types, the search engines use text and link information contained within the documents in order to retrieve relevant documents and rank them. However, layout information contained within the documents is generally ignored.

Nevertheless, querying document collections by document layout would be extremely useful when a user possesses visual, as opposed to textual, information, or when a query is difficult or even impossible to express with keywords. This is particularly true in the office environment, where documents often have a generic structure, such as financial bills, forms, templates, catalogs, CVs, letters, etc. It would be advantageous for office personnel to find documents with a layout similar to a given document. Unfortunately, none of the current document query systems is capable of addressing such a need.

Example-based querying is widely used in the context of content-based image retrieval. However, because images are inherently complex, the understanding and semantic indexing of images is limited to specialized query types such as exact image matching, logo recognition and more categorization-like tasks, such as recognizing sky, flower or bike images. Querying by document layout can be considered a form of example-based querying. However, accurate relevance ranking of images by their (semantic) similarity is still far beyond the capabilities of current systems.

Existing methods of querying document collections by layout generally require intense processing for each (document, query) pair, including a 2-dimensional alignment between a query and each document in the collection. Geometric page layout analysis (GPLA) algorithms recognize different elements of a page, often in terms of text blocks and image blocks. Examples of such algorithms include the X-Y Cut algorithm, described by Nagy et al. (*A prototype document image analysis system for technical journals. Computer,* 7(25): 10-22, 1992) and the Smearing algorithm, described by Wong et al. (*Document analysis system. IBM Journal of Research and Development,* 26(6):647-656, 1982). These GPLA algorithms receive as input a page image and perform a segmentation based on information (such as pixel information) gathered from the page. These approaches to element recognition are either top-down or bottom-up and mainly aim to delimit boxes of text or images in a page. Some methods, such as the X-Y Cut algorithm, can generate hierarchical relations among recognized blocks.

Such alignment algorithms are time consuming and limit alignment-based techniques to small and medium size collections. In a very large collection, the user is often interested in retrieving the top k relevant documents, thus the exhaustive document-to-query alignment can be unnecessary and time consuming.

For large collection of electronic documents, querying by layout would be useful when the user defines some visual keys for querying, or when a query is hard to express with keywords. This is particularly true in the office environment, where large numbers of financial records, such as bills, different forms, templates, catalogs, resumes, letters, and the like are stored and may be difficult to distinguish using text-based searching.

In above-mentioned U.S. application Ser. No. 12/556,098, a method for indexing and querying documents by their layout is disclosed. The method queries by page layout. The present exemplary embodiment provides a system and method for indexing and querying documents by layout that allows querying by parts of a page.

INCORPORATION BY REFERENCE

The following references, the disclosures of which are incorporated in their entireties my reference, are mentioned:

U.S. Pat. No. 7,099,861, issued Aug. 29, 2006, entitled SYSTEM AND METHOD FOR FACILITATING INTERNET SEARCH BY PROVIDING WEB DOCUMENT LAYOUT IMAGE, by Youn, discloses a search system including a robot agent for extracting web document information and layout images of web documents on the Internet which are stored and searchable using search criteria.

U.S. Pat. No. 7,475,061, issued Jan. 6, 2009, entitled IMAGE-BASED DOCUMENT INDEXING AND RETRIEVAL, by Bargeron, et al., discloses a system that facilitates document retrieval and/or indexing. A component receives an image of a document, and a search component searches data store(s) for a match to the document image. The match is performed over word-level topological properties (e.g., widths of words) of images of documents stored in the data store(s).

Methods for detection of various types of page elements are disclosed, for example, in U.S. Pub. Nos. 20060156226, published Jul. 13, 2006, entitled METHOD AND APPARATUS FOR DETECTING PAGINATION CONSTRUCTS INCLUDING A HEADER AND A FOOTER IN LEGACY DOCUMENTS; 20060248070, published Nov. 2, 2006, entitled STRUCTURING DOCUMENT BASED ON TABLE OF CONTENTS; 20080077847, published Mar. 27, 2008, entitled CAPTIONS DETECTOR; 20080114757, published May 15, 2008, entitled VERSATILE PAGE NUMBER DETECTOR; and 20090046918, published Feb. 19, 2009, entitled SYSTEMS AND METHODS FOR NOTES DETECTION, all by Déjean, et al.

BRIEF DESCRIPTION

In accordance with one aspect of the exemplary embodiment, a method for querying a document collection includes providing an index for a collection of documents in which content of document pages in the collection that has been decomposed into blocks is indexed according to representations of the blocks and geometric relations between the blocks. A query document page is received into memory. Provision is made for a query zone to be identified within the query document page which has an area smaller than that of the document page. A query is generated which is based on representations of blocks determined to be within the query zone and geometric relations between them. The index is queried with the generated query to identify similar pages of documents in the collection.

In another aspect, a system includes memory which stores an index for a document collection, the index comprising, for each of a set of document pages, a set of at least one triple, each triple comprising a respective representation for two layout blocks extracted from the document page and a geometric relation between the two layout blocks. Instructions are stored in memory for querying the index with a query zone query to identify similar document pages, the query zone query being based on at least one triple, each triple comprising a respective representation for two layout blocks determined to be within a selected query zone within a query document page and a geometric relation between the two layout blocks. A processor in communication with the memory executes the instructions.

In another aspect, a method for querying a document collection, includes providing an index for a collection of documents in which content of document pages in the collection that has been decomposed into blocks is indexed according to representations of the blocks, receiving a query document page into memory, providing for a query zone to be identified within the query document page which has an area smaller than that of the document page, generating a query based on representations of blocks determined to be within the query zone, and querying the index with the generated query to identify pages of documents in the collection which have a layout zone which is similar to the query zone.

In another aspect, a method for indexing a document collection includes receiving a collection of document pages to be indexed and, for each of the document pages, decomposing the viewable content of the page into a set of layout blocks. With a computer processor, a representation of each layout block is generated, which includes geometric attributes of the layout block. Triples are stored in an index, each triple comprising a respective representation for each of a pair of the layout blocks and a geometric relation between the pair of layout blocks, whereby the index is queryable based on at least one triple for a query zone of a query document.

DETAILED DESCRIPTION

Figure 3:
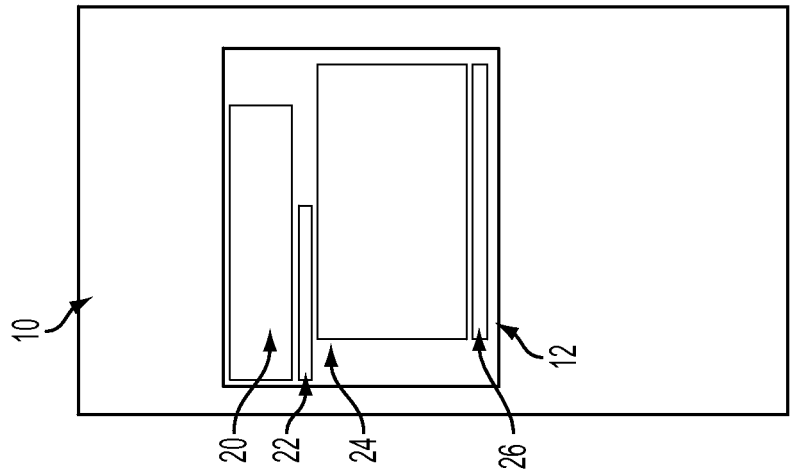
FIG. 3 illustrates the query zone blocks with their text and image content removed.

Aspects of the present exemplary embodiment relate to a system and method for indexing and querying documents according to document layout at the sub-document level.

Copending application Ser. No. 12/556,098 describes a system and method for indexing and querying documents by their layout. That method is particularly suited to the case where documents are indexed and queried on the basis of an entire page of a document. The present embodiment provides for the case where it is advantageous to query by a document fragment only, which is referred to herein as a query zone. Querying, in the present method, thus takes place at the sub-document level, where a query is not based on an entire document page but only on a fragment thereof.

The exemplary layout-based querying is an extension of the keyword-based querying, but relies more heavily on visual cues and patterns in documents with significant layout aspects, such as the fragment type (textual, image, video), shape and attributes (fonts, styles, alignment, etc.) In various aspects, the method supports the fast retrieval of k most relevant documents for a query zone. This is achieved through the extraction of both layout blocks and their relations from both a query zone and documents in a collection of documents which are indexed based on this information. In various aspects, use is made of multi-dimensional indexing structures to allow the storage and fast neighbor search by complex triple queries.

The sub-document layout querying may be useful in the following cases, among others:

1. Relevance criteria are given by a layout fragment of a document.

2. A part of a document page layout should be ignored.

3. Querying does not require preserving its absolute position in the document.

The exemplary method for querying by layout can extend the functionality of a document management system, where it can be employed as a stand-alone option for searching and retrieval. Or, it can be combined with the conventional keyword based document querying.

The sub-document querying disclosed herein addresses several issues not considered in the case of whole document matching. The first is the problem of query location. Here, the query zone can float over the document to find the best match. A second issue is of defining the query in terms of a set of blocks and their relations. A third issue relates to storing of the indexed documents in the collection and ranking candidate matching documents in order to ensure the querying efficiency.

As used herein, a "document" can be an electronic document in any suitable form, such as PDF, TIFF, BMP, or Microsoft Office document and may include images, text, or combinations thereof. Images can be photographs, graphics, etc.

The querying method assumes the existence of a collection of documents which are indexed according to their layout. Each document may include one or more pages, and for each page, a separate layout may be indexed. In other embodiments, only one or a few pages of a document in the collection is/are indexed, such as the first page.

To index the documents, the layout for each document page in a collection is extracted from the respective document. A layout is defined by the arrangement of text fragments and images in a given document page. Conceptually, a layout can be thought of as one or more layout blocks arranged on a document page, with each layout block containing a fragment of contiguous text and/or pictures. Each block has an area which may be the minimum required to completely bound the text or image contained in the block.

The dimensions and location of a block may be extracted from the document page as metadata, which identifies separate blocks of text and images. In general, in the case of text, a block may include one or more paragraphs. Where a text block includes more than one paragraph, the paragraphs may possess similar characteristics, such as the font type and/or size, the alignment of the text (e.g., left aligned, right aligned or justified), the maximum width of the text (e.g., set by the page margins and any indents), and the like. In the exemplary embodiment, each block is expressed as a tuple which includes dimension-related attributes (e.g., location points which define its shape or dimensions) of the block and other attributes of the block, such as whether it contains an image or text (in some cases, other block categories may be provided, such as video, internet link, and so forth), and in the case of text, optionally additional attributes, such as text alignment in the block, font style (e.g., Arial, Times New Roman, etc.) and the like. Geometric relationships between blocks are also extracted, which express the distance between blocks, e.g., in two orthogonal dimensions. Here x is used for the horizontal dimension of the page, which generally runs parallel to lines of text, and y is used for the vertical dimension. The various attributes and geometrical relationships can be expressed numerically and also weighted according to their importance. Once the collection has been indexed, it can be queried using similar tuples extracted from a query zone of a document.

Figure 1:
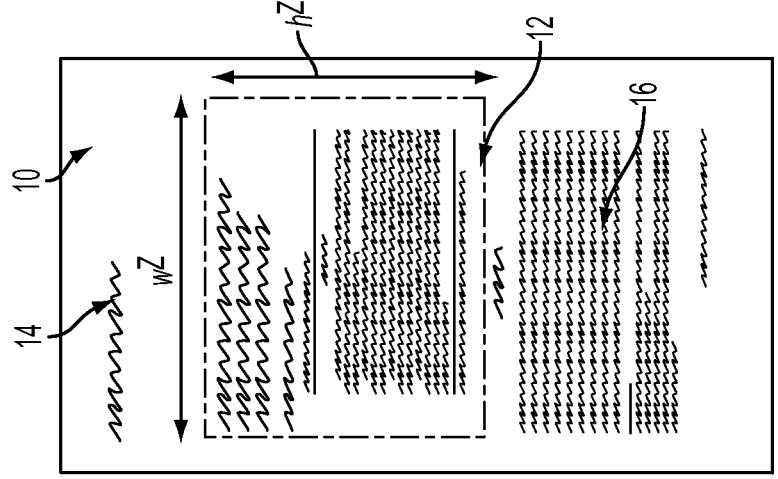
FIG. 1 is an example of a page of an input electronic document which is to be used to generate a query for searching the document collection (or that is part of a document collection to be indexed)

FIG. 1, by way of example, illustrates an exemplary document page 10 which could be used as the basis of a query to find similar documents in the collection. In the illustrated example, a query zone 12 is selected by a user which has a height $h^Z$ and width $w^Z$. The query zone 12 is smaller, in size, than the page 10 (i.e., at least one of height $h^Z$ and width $w^Z$ is smaller than the page height and width and its printable area) such that less than all the content of the document page falls within the query zone. For example, in the illustrated document page text 14,16 is outside the query zone 12 and is not used as a part of the query.

Contained within illustrated the query zone 12 is an arrangement of text blocks 20, 22, 24, 26 which the user wishes to use as the basis of the search. These four blocks 20, 22, 24, 26 are highlighted in FIG. 2. In selecting a query zone, the user is generally required to contain two or more text and/or image blocks wholly within the query zone 12. Blocks which fall only partially within the zone may be ignored or the user may be advised to redraw the query zone to either exclude or include them.

FIG. 3 shows the four extracted blocks 20, 22, 24, 26, with the text removed. The shape and geometrical relationships between these four blocks form the basis of the query. In the exemplary embodiment, the actual text or image content of the blocks does not form a part of the query, although attributes of the text, as noted above, may be included.

Figure 4:
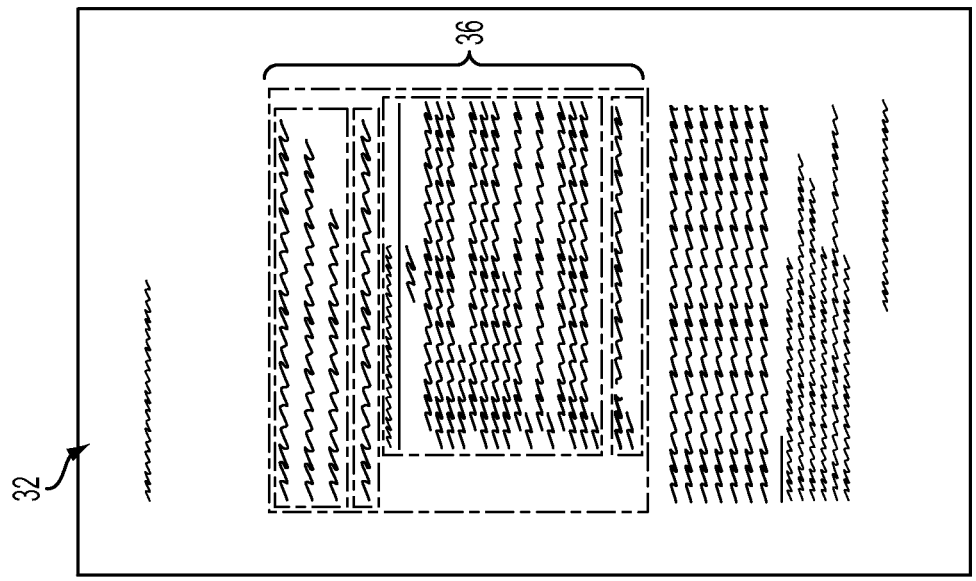
FIG. 4 illustrates two candidate documents for matching the query zone in FIG. 2.
Figure 4:
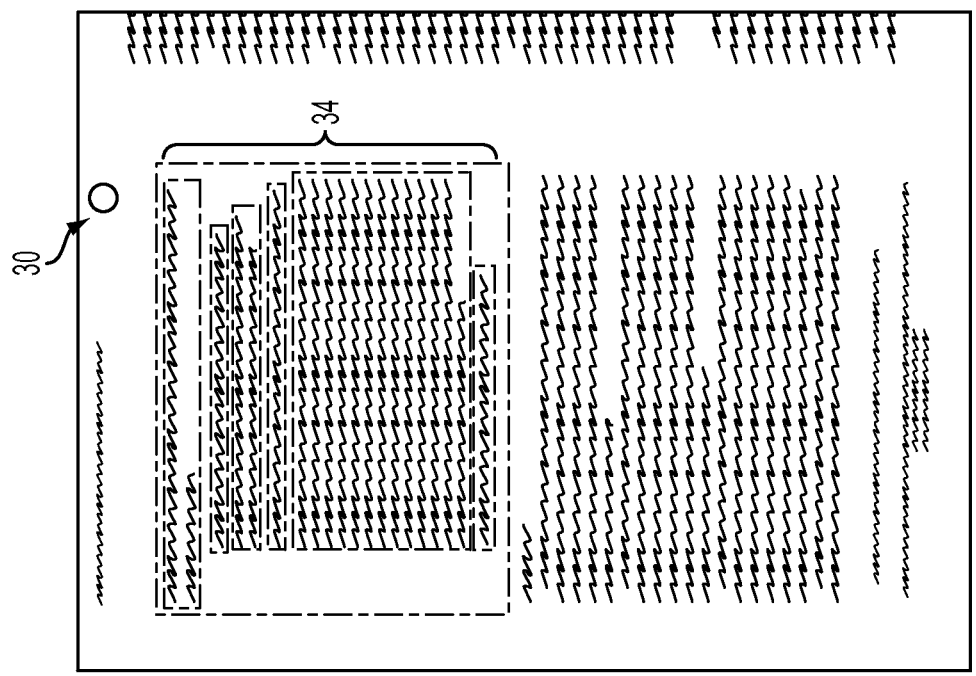

In querying documents in the collection, a search is made for document pages with a similar arrangement of blocks, taking into account the attributes of the blocks. However, the blocks do not need to be located in the same region of the page as the original query zone 12. In this respect, the query zone can be considered to be floating, thus addressing not the absolute but relative positions of fragments in a document. This is illustrated in FIG. 4, where two candidate document pages 30, 32 are shown, together with a respective set 34, 36 of blocks under consideration as a query match, which are indexed according to their relations between them, as well as other blocks on the page.

Figure 2:
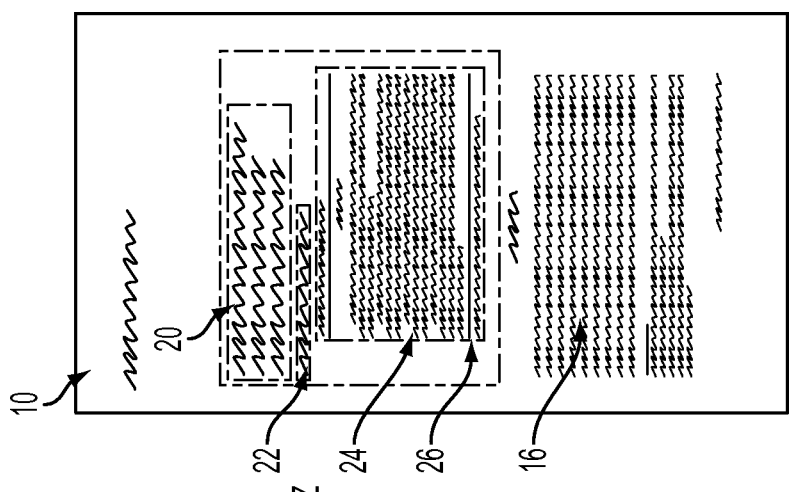
FIG. 2 illustrates the document of FIG. 1 decomposed into blocks of text in a selected query zone.
Figure 5:
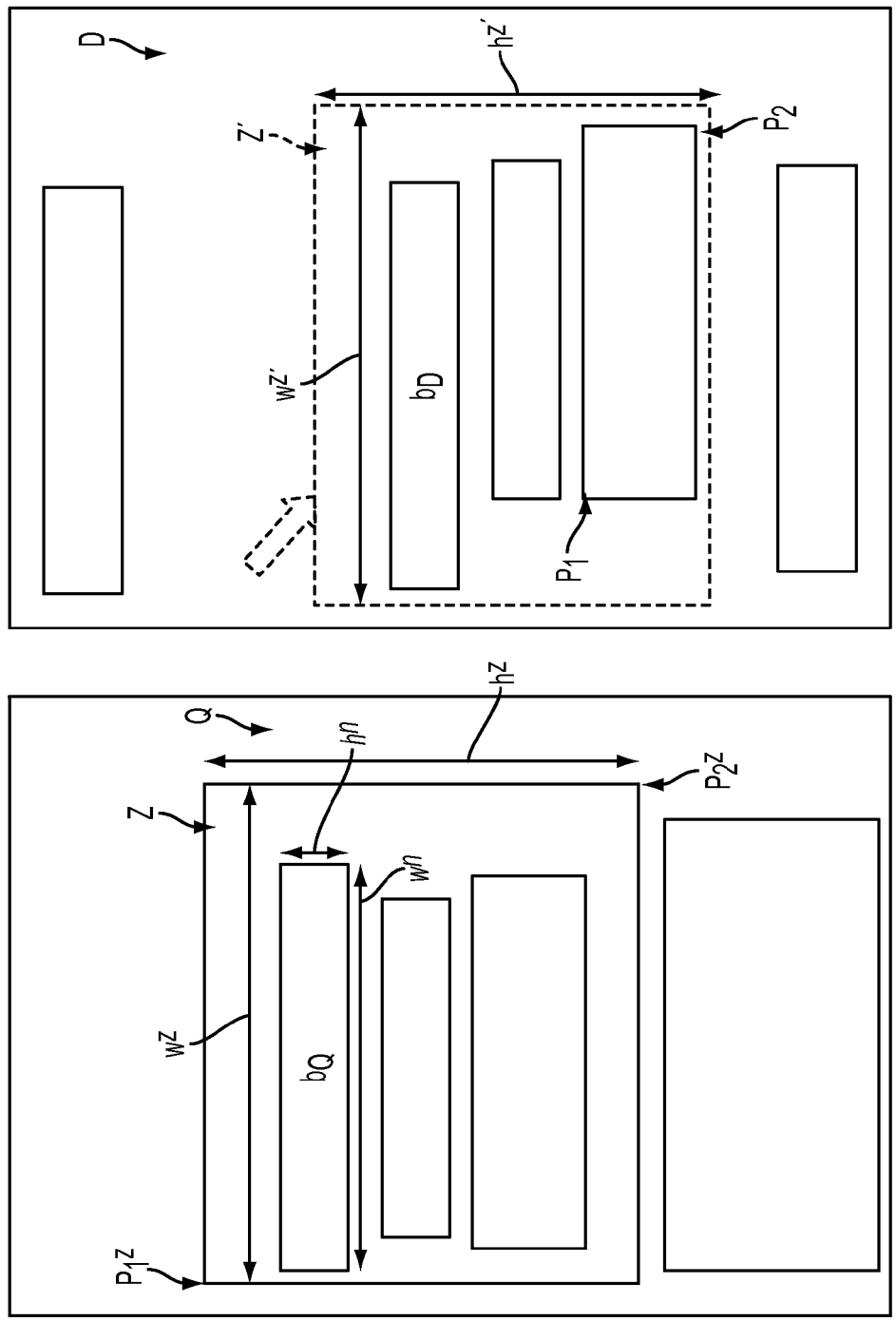
FIG. 5 illustrates comparison of a query document with a document from the collection.

Referring now to FIG. 5, for purposes of the following description, a query is defined by a floating document fragment of a document, defined as a pair (Q,Z), where Q represents a document, such as document 10, and Z is the query zone in Q, such as query zone 12 in FIG. 2. The query zone is defined by a set of features. For example, in the case of a rectangle, the query zone can be defined by a minimum of two points, e.g., $Z=(p_1^Z, p_2^Z)$ in Q, where $p_1^Z$ and $p_2^Z$ are, for example, the upper left and lower right corners of the query zone. Alternatively, zone Z can be defined as $(h^Z, w^Z)$ defining its height and width. In the following, the case of the rectangular query zone is considered, as in FIGS. 1-3 and 5, although other shapes are also contemplated.

Figure 6:
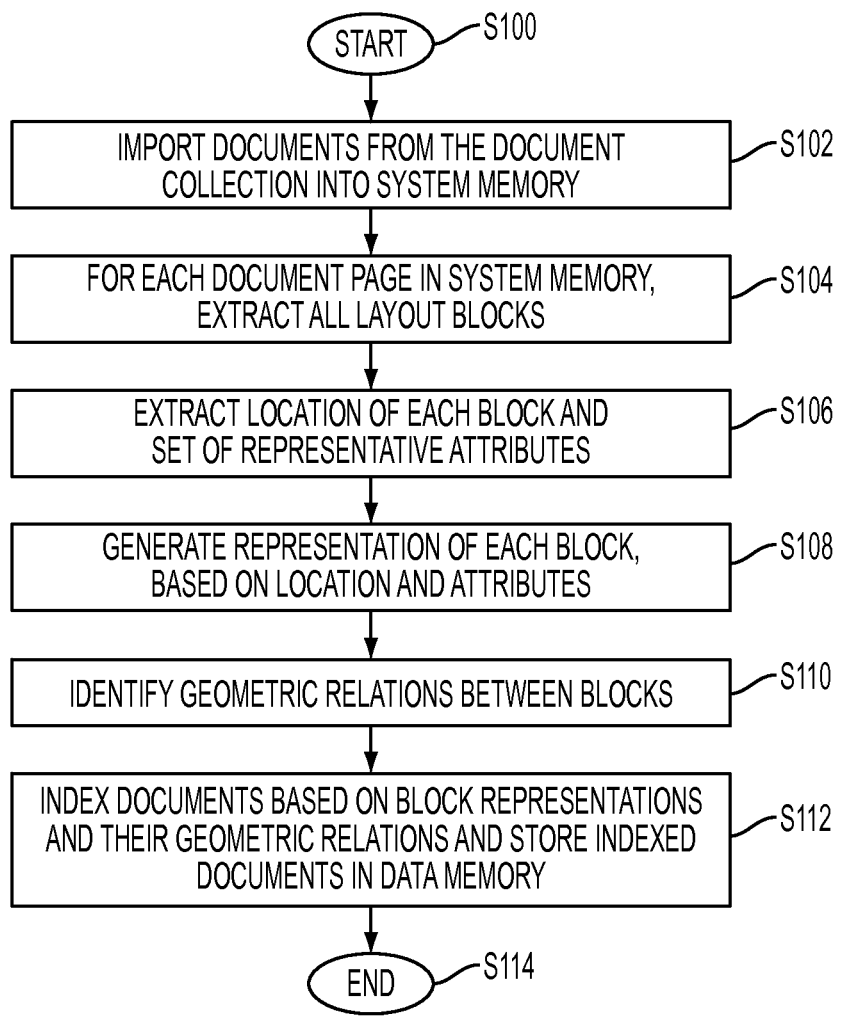
FIG. 6 is a flow diagram illustrating a method for indexing a collection of documents.
Figure 7:
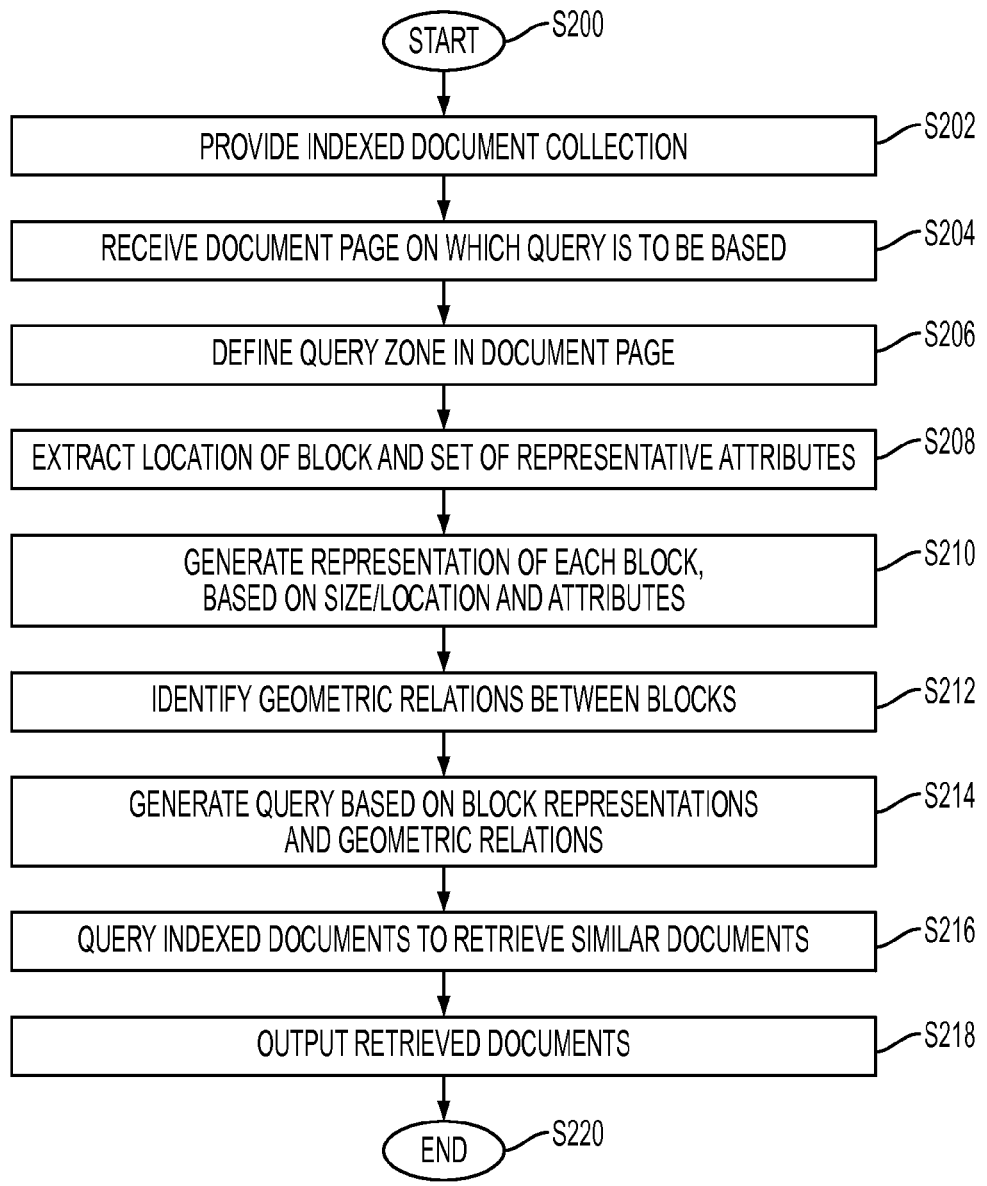
FIG. 7 is a flow diagram illustrating a method for querying the a collection of indexed documents.
Figure 8:
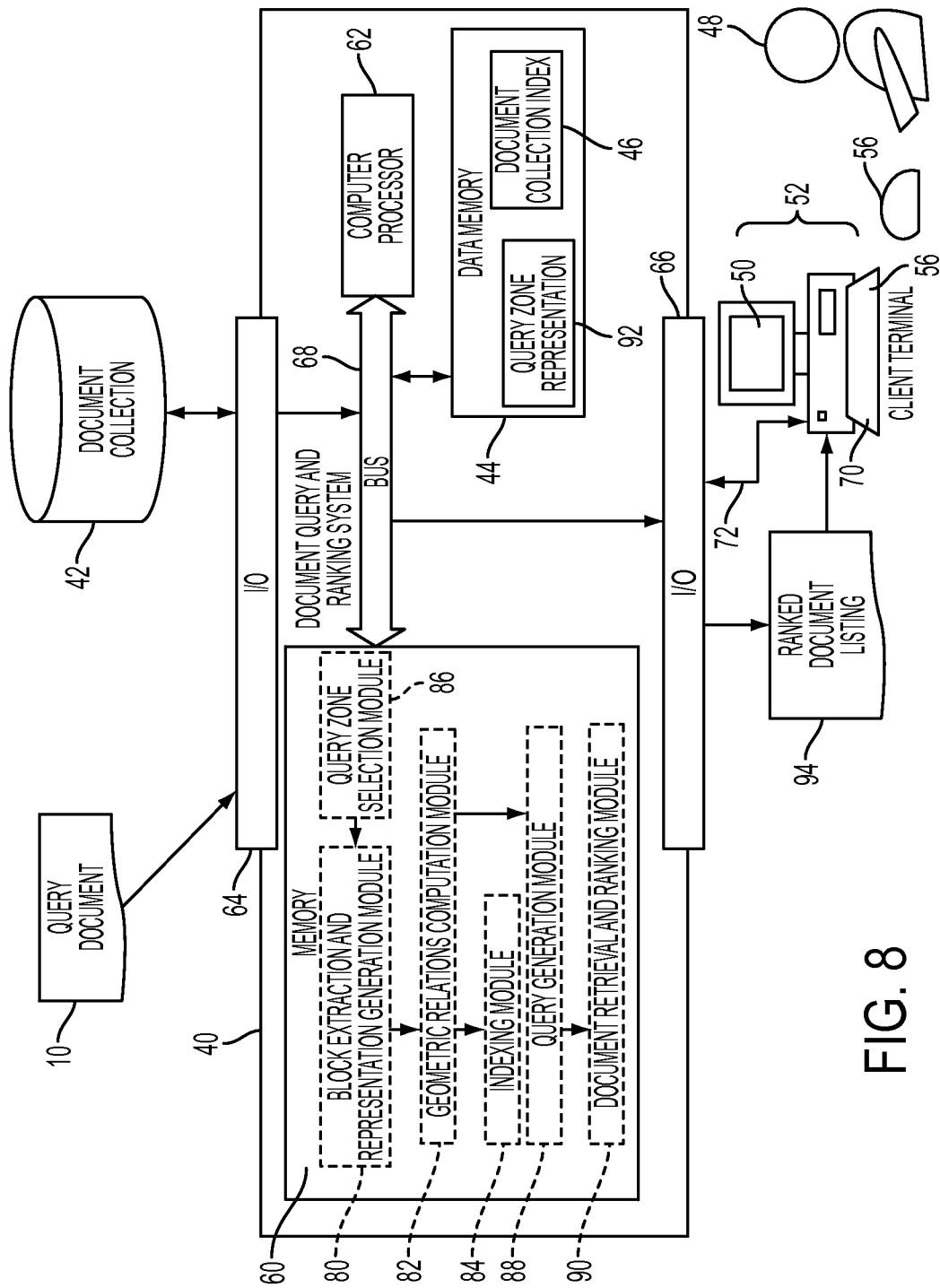
FIG. 8 is a functional block diagram for a document layout index and querying system.

FIG. 6 illustrates a method of indexing documents to form a collection. FIG. 7 illustrates the querying method which may be performed with the indexed collection. FIG. 8 illustrates an exemplary computer implemented querying system 40 which can be used for performing the method illustrated in FIG. 7. This system 40, or a separate system, may be used for performing the indexing procedure for the document collection illustrated in FIG. 6.

Referring first to FIG. 6, the indexing method begins at S100. At S102, a collection of document pages 42 to be indexed is provided in memory 44 of system 40. For each page, the method proceeds as follows:

At S104, the visually displayable content of the page is decomposed into a set of blocks (text, image, etc), which are extracted from the document page. Each set of blocks generally includes at least one block. Pages which are completely blank may thus be ignored. The extraction aims to assign all the visually displayed information in a document to a respective block. In general, each page will include at least two and generally at least three blocks. The number of blocks can be up to about 50 per page.

At S106, for each block, a set of attributes is extracted. These include the block's geometric attributes, such as its normalized location on the page and/or its normalized dimensions, and one or more other attributes. In one embodiment, the geometric attributes which are sufficient to define the block's size and page location, such as a set of two points to represent the upper left and bottom right corners, are extracted.

At S108, the block is characterized by a representation based on the location and extracted attribute(s) of the block.

At S110, geometric relations between blocks on the same page may be extracted.

At S112, for each document, the pages are indexed according to the block representations and their geometric relations. The index 46 is stored in data memory 44, or a separate non-transitory memory device accessible by the system 40.

The method ends at S114.

Referring now to FIG. 7 and with reference also to FIG. 8, the querying method proceeds as follows. The method begins at S200.

At S202, an indexed collection of documents 42 is provided.

At S204, a digital document page 10 to be used as a query is input to the system 40 where it may be stored in data memory 44.

At S206, a query zone 12 is defined. For example, the document page 10 may be displayed to a user 48, e.g., on a screen 50 of a graphical user interface (GUI) 52 associated with the system 40. The user may use a user interface device 56, such as a cursor, touch screen, keyboard, or the like to define the query zone. For example, the user may move the cursor to define a rectangle around an area to form the query zone. Geometric features of the query zone are extracted, such as the normalized (x,y) coordinates of the points which define opposed corners, coordinates of a central point within the query zone, its area, height/width ratio, or combination thereof. One or more of these geometric feature(s) can thus be used to define the query zone.

At S208, blocks within the query zone 12 are extracted and their geometric attributes and other attributes determined.

At S210, a representation is generated for each of the extracted blocks based on these attributes. Blocks outside the query zone are ignored.

At S212, geometric relations between the blocks are determined as for S110, but here only the extracted blocks in the query zone are considered. In one embodiment, each extracted block is covered by at least one geometric relation.

At S214 a query is generated, based on the geometric relations and block representations.

At S216, similar documents are retrieved. For example, the query is compared to the indexed collection of documents to retrieve similar documents. A subset of the documents, such as the k documents ranked most similar is returned. Where documents with similar rankings are retrieved, the ranking may take into account other factors, such as the size ($h^{Z'}, w^{Z'}$) of the layout zone Z' in the document in comparison to the size of the query zone ($h^Z, w^Z$)

At S218, the retrieved documents may be output, e.g., presented to the user via the GUI, stored in memory, e.g., as the entire document or as a link thereto, or output to an image rendering device, such as a printer.

The method ends at S220.

Returning to FIG. 8, the exemplary system 40 for indexing and querying documents according to their layout will now be described in greater detail. The exemplary system is in the form of one or more computing devices including main memory 60, data memory 44, a computer processor 62 and one or more inputs/outputs 64, 66, all communicatively connected by a data control bus 68. The GUI 52, which in the illustrated embodiment is hosted by a client terminal 70, with a separate processor and memory (not shown) is connected with the computer system 40 via a wired or wireless connection 72, such as a local area network or wide area network, such as the Internet. The system input 64 is configured for receiving the document collection 42 as well as a query document 10. Prior to inputting, the document collection may be stored in any suitable tangible media such as a ROM or RAM drive or may be input into the system in the form of a carrier wave, e.g., via the Internet or other network. Alternatively, the document collection is provided within the computing device 40 itself or stored in a separate memory accessible to the system 40. The input 64 may include a modem link, a wired or wireless connection, USB port, floppy or hard disk drive, or the like.

Main memory 60 of the system stores a block extraction and representation generation module 80, a geometric relations computation module 82, a document page indexing module 84, a query zone selection module 86, a query generation module 88, and a document retrieval and ranking module 90. The block extraction and representation generation module 80 extracts the layout blocks 20, 22, 24, 26 from each document 30, 32 in the document collection 42 and generates a representation thereof based on its representative attributes (S104, S106, S108). Similarly, the module 80 (or a separate module) extracts blocks and generates representations thereof from a query zone 12 of a query document 10 (S208, S210). The module 80 may be any module suitable to extract bounding blocks from a document and associate attributes with the block. The geometric relations computation component 82 computes geometric relations among blocks of a document 30, 32 (S110). Component 82 (or a separate component) computes geometric relations among blocks within a query zone 12 of a query document 10 (S212). The document indexing module 84 creates a document index 46 for each document 30, 32 in the document collection 42 based on the block representations and geometric relations for each document page and stores the index in memory, such as memory 44 (S112). Once the documents in collection 42 have been indexed, the documents themselves need not be stored, but could be linked, for example, by a web address or other static link. The query zone selection module 86 interacts with the user via the GUI 52 to define a query zone 12 for a query document 10 (S206). The query generation module 88 generates a query 92 for the query zone 12 of a query document based on the block representations and geometric relations (S214). The document retrieval and ranking module 90 queries the index 46 to retrieve responsive documents. A list of 94 the most responsive documents is output, which may be presented to the user via the GUI 52, or otherwise output. The various modules 80, 82, 84, 86, 88, 90 may be implemented as hardware or software or a combination thereof. In the exemplary embodiment, these components 80, 82, 84, 86, 88, 90 are in the form of software instructions stored in main memory 60, which are executed by a computer processor 62 in communication with memory 60. The processor 62, such as the computer's CPU, may control the overall operation of the computer system 40 by execution of processing instructions stored in memory 60.

As will be appreciated, the exemplary system 40 may comprise one or more computing devices, such as a personal computer, PDA, laptop computer, server computer, or combination thereof. Memories 44, 62 may be integral or separate and may represent any type of computer readable medium such as random access memory (RAM), read only memory (ROM), magnetic disk or tape, optical disk, flash memory, or holographic memory. In one embodiment, the memories 44, 62 comprise a combination of random access memory and read only memory. In some embodiments, the processor 62 and memory 60 and/or 44 may be combined in a single chip.

As will be appreciated, while FIG. 8 shows components for both document indexing and querying the indexed documents, these functions may be performed by separate computing devices with appropriate modules suitable for performing the respective methods of FIGS. 6 and 7.

The system and method are described in further detail below.

Block Extraction

The exemplary indexing method is suited to indexing large collections of layout-oriented documents, available in a variety of formats, such as PDF, MS Word, and Postscript formats. In the case of PDF documents, the block extraction may be performed with PDF-to-XML conversion tools. Similar low-level conversion tools extract bounding blocks for textual and image regions. Without loss of generalization, one-page layouts are considered, where multi-page documents are represented by a set of individual pages.

In the case of the documents in the collection, at S104, the page is decomposed into blocks and their attributes are stored (block type, style, font face/size, alignment). The type of document may determine the types of attributes which can be extracted. In the case of text blocks, further attributes may be extracted, such as the type of text block e.g., main text areas, page number, title, main body etc, page headers, page footers, email addresses, table of contents entries and corresponding titles in the document body, captions footnotes, drop caps, copyright notices, and the like.

For the query document, only the blocks in the query zone are extracted and their attributes identified at S208.

In the exemplary embodiment, the indexing of documents in the collection (FIG. 6) takes place prior to the query document being submitted. However, in other embodiments, the documents in the collection may be processed after the query has been submitted.

Defining the Query Zone (S206)

The query zone as noted above is defined at least partly by the user. In the case that the user does not fully surround one or more of the identifiable layout blocks within it, the system may modify the query zone size automatically. For example, if the query zone covers at least an upper threshold area of the block, e.g., 90% of a block, it may be automatically included. If less than a lower threshold of the block's area is covered, e.g., 60%, it may be ignored. In other embodiments, the user may be shown which blocks are included, allowing the user to modify the zone to encompass desired blocks. In some embodiments, once the user has defined the query zone, it may be automatically resized by the system to the minimum size required to bound the blocks that are within it.

The query zone size and/or location (normalized to [0,1], where 1 corresponds to the full page with or height, respectively) are stored. While the system may permit a user to define a query zone whose normalized dimensions are [1,1], i.e., the query zone corresponds to the entire query document page, in general at least one or both of each normalized dimension is <1 and both normalized dimensions are >0.

Sub-document Layout Querying (S214, S216)

The sub-document layout querying problem can be defined as follows: given as input query a query zone Z in a document Q and a document collection S, the object is to retrieve from S the k-top documents $D_1, D_2, \ldots, D_k$, each containing a layout zone Z' which matches the query zone Z. By "matches," it is meant that for the zones Z and Z', their block content, such as with respect to the blocks (block types, shapes, fonts, etc.), and geometric relations between blocks are similar, according to a similarity measure which is designed to simulate human perception of the layout similarity. For example, in the case of the technical query document 10 shown in FIG. 2, query zone 12 catches several metadata elements as blocks 20, 22, 24, 26. In FIG. 4, the two documents 30, 32 in the collection contain layout zones 34, 36 similar to the query zone 12. Neither is an exact match. However, the layout zone 34 of document 30 would be perceived as matching the query zone 12 better than layout zone 36 of document 32, because of the better match of the layout aspects, such as blocks composing the zone, their types, relations between blocks, the fonts used, etc. The exemplary method allows weighting of the attributes of the representation of query zone Z such that attributes which weigh more heavily in human perception are more heavily weighted.

Block Representation and Similarity Measurement

Let $S^L$ denote the collection of document layouts where each document layout $D^L$ is given by a set of rectangular blocks, where each block is textual, image or multimedia one and is given by its attributes, including position, shape, size, style, font, etc. Each document layout $D^L$ is given by a set of blocks, $D^L=(b_1, \ldots, b_n)$, where each block $b_i$ may be defined by location information, such as by two points $(p_1, p_2)$, e.g., the top-right and bottom-left corners of $b_i$, $p_1=(x_1,y_1)$ and $p_2=(x_2,y_2)$, as shown in FIG. 5.

In one aspect of the exemplary embodiment, blocks are each represented by a set of attributes which incorporates the block positions and extends them with other block attributes. For example, a tuple in the form:

$$t=(h^n, w^n \text{ ratio, block type, other attributes})$$

is defined for each block, where:

$h^n$ and $w^n$ are the height and width values of the block (e.g., expressed as number pixels), which may be normalized to the [0,1] range, where 1 corresponds to the full width/height of the page respectively;

ratio is the ratio of height $h^n$ to width $w^n$ of the block, which may be normalized in such a way that a square shape is 0.5 while more vertically extending and more horizontally extending blocks tend to 0 and 1, respectively;

block type is the type of block (image, text, multimedia, video, etc.). Each of the types may be assigned a value, such as 1 for image, 2 for text, 3 for multimedia, etc.

other attributes may be a list of one or more other available block attributes, such as one or more of style, font face/size, alignment, indented, etc. Here again, each attribute type may have a set of values from which an appropriate value is assigned to the block. For example, for the alignment attribute, a left aligned block may have a value of 1, a right aligned block a value 2, a centered block 3, and so forth.

The attributes may all be normalized to a scale of 0-1. As will be appreciated, any set of attributes suited to the document collection may be used, with each attribute assigned a specific position in the tuple. For example, an exemplary tuple (0.6, 0.5, 0.4, 0.1, 0.1, 0) may represent a block with a normalized height of 0.6, a normalized width of 0.5, a normalized ratio of 0.4 (because it is greater in the vertical direction), is text only, has an alignment which is left aligned and which is not indented from the page margin. In other embodiments, absolute positions $x_1^n, y_1^n, x_2^n, y_2^n$, may be used in the tuple, in place of height and width $h^n, w^n$, for the blocks dimensions, where $x_1^n, y_1^n, x_2^n, y_2^n$, are the values of opposed corners $p_1=(x_1,y_1)$ and $p_2=(x_2,y_2)$ with each of the values being normalized to the [0,1] range. Where absolute positions are used, as the layout zone Z' is translated across the document page D, during the querying stage, the values of $x_1^n, y_1^n, x_2^n, y_2^n$ in the corresponding tuples may be shifted correspondingly.

Having determined the tuples for two blocks $b_Q$ and $b_D$ from a query zone Z and document D in the collection, respectively, their layout similarity may be given by the cosine function over their tuples $t_Q$ and $t_D$, i.e., $\text{sim}_{layout}(b_Q,b_D)=\text{cosine}(t_Q,t_D)$. In one embodiment, the layout similarity is extended to comparison of triples which include geometric relations between blocks as well as the tuples, as described in greater detail below.

Query Matching

Two methods of finding the best fit between the query zone Z and a layout zone Z' of the document in the collection are now described.

1. Best Fit Using Block Relations

This approach is based on the decomposition of both query and collection document into blocks (S106, S108; S208, S210) and the identification of geometric relations among them (S110, S212). This permits indexing the documents in such a way that the k-top document retrieval is achieved in sub-linear time. With reference to FIG. 9, exemplary pairs of blocks denoted $b_1$ and $b_2$ are shown. The geometric relation r expresses the relative positions of the two blocks $b_1$ and $b_2$. It may be defined as $r=(r_x,r_y)$ where $r_x=\max(0,x_{21}-x_{12})$ and $r_y=\max(0,y_{21}-y_{12})$ and can be interpreted as the vertical and horizontal distance between the blocks. Where blocks are in contact or overlapping, one or both of $r_x$ and $r_y$ may thus be 0.

In the exemplary embodiment, two blocks (as described by their tuples) and their geometric relation form a triple $(t_{b1}, t_{b2}, r)$, where $t_{b1}$ represents the tuple for block $b_1$, $t_{b2}$ represents the tuple for block $b_2$ and r the relation between blocks $b_1$ and $b_2$. One or more of the elements of the triple may be weighted. This optionally weighted triple allows the geometric relation to play a role in sub-document querying as well as the tuples of the blocks themselves.

To compare two triples, a cosine function of their weighted triples may be computed. Since a query zone may include two or more triples, the overall similarity of the query zone and a document page may be a function of the similarities over two or more pairs of triples.

Figure 9A:
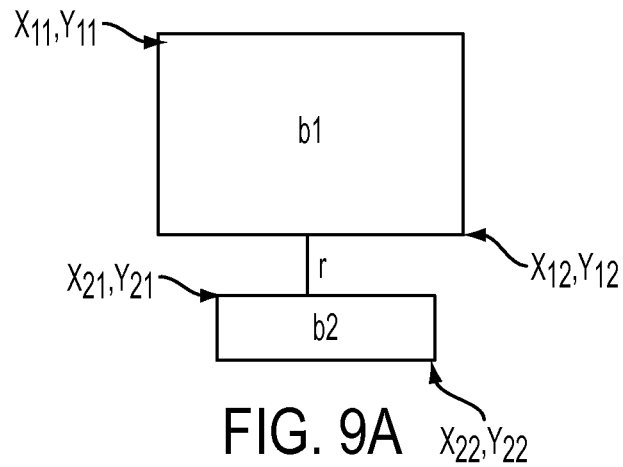
FIG. 9 graphically illustrates exemplary triples comprising attribute information for first and second blocks and a geometric relation between them.
Figure 9B:
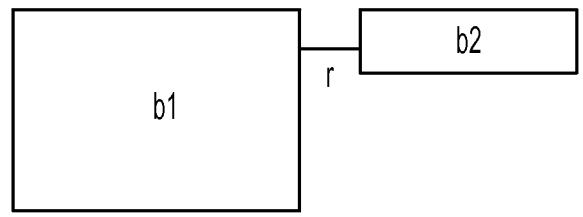
Figure 9C:
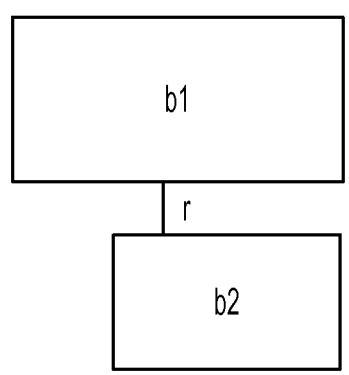

For example, assume the blocks in FIG. 9a are two blocks in the query zone Z linked by a relation r and the blocks in FIGS. 9b and 9c are two blocks in respective documents D being compared, also linked by a respective relation r. Assume also, for simplicity, that their tuple attributes are identical, other than height- and width-related attributes. Then, in the example, the triple of FIG. 9a has tuples for blocks $b_1$ and $b_2$ identical to those of FIG. 9b but linked through a different (horizontal vs. vertical) relation.

By weighting the relation r appropriately with a weight α, the similarity between FIG. 9a and FIG. 9c can be computed to be higher than between FIG. 9a and FIG. 9b to allow for the observation that two triples with somewhat different block shapes but which have a similar relation (both vertical in this case) are perceived as more similar.

Indexing of Triples

The collection of document layouts is preprocessed in a way that makes the retrieval of k-top responses to a query (Q, Z) faster. To allow for a floating query zone, the relative positions of blocks composing a page may be indexed rather than their absolute positions. Blocks as well as relations between neighbor blocks are indexed. Each triple $(t_{b1}, t_{b2}, r)$ can be represented as a d-tuple. Let l denote the length of block tuples $t_{b1}$ and $t_{b2}$ then the length of d-tuple denoted |d|, is 2*l+2. A multi-dimensional index can then be used to store the d-tuples and allow retrieval of the k-top documents, based on similarity of at least one of the d-tuples.

Each dimension $d_i$ in the d-tuples is rescaled in two steps. First, all values of dimension $d_i$ in d-tuples are normalized to the standard range [0,1].

Second, all values of the dimension $d_i$ are multiplied by the weight $\alpha_i$. The re-weighting with $\alpha_i$ is a method to add more (or less) importance to particular attribute(s) of d-tuples being indexed. The exemplary scaling is a linear transformation executed on the documents in the collection in the preprocessing step. Suitable weights $\alpha_i$ may be obtained by inferring the importance of the weights from a dataset of documents and user feedback as to which triples are perceived as being more similar. In one embodiment, all weights are 1 in the triple, except for the weight for relation r, which can be 2, 3 or more.

An exemplary indexing procedure may proceed according to the following algorithm:

Algorithm 1: Indexing Documents in Collection

Input: document collection S, weights $\alpha_i$
Output: Index I of block-relation triples
1. for each document D in the set S do
2.    determine all neighbor pairs blocks $b_1,b_2$ and their relation r
3.    for each triple $(b_1,b_2,r)$ do
4.       Construct the tuple d={$d_i$}, i=1,...,|d|
5.       Scale all values in $d_i$ to [0,1] range
6.       Weigh each dimension $d_i$ by $\alpha_i$, d' ={$\alpha_i d_i$}
7.       Store d' in the multi-dimensional index I
8.    od
9. od In the above algorithm, step 2 is performed for all neighbor pairs of blocks, i.e., blocks which are most closely adjacent horizontally and/or vertically. For example, for a given block, its two closest neighbors may be identified, based on the normalized distances between them. However, in some embodiments, the indexing allows for block-relation triples for fewer than all possible neighboring pairs to be indexed. In general, each block is covered by at least one block-relation triple. In some embodiments a network of blocks which creates a minimum number of relations is determined and triples for this network are generated. The network can take the form of a connected relation graph (CG). According to this strategy, all blocks form a minimally connected graph. In other words, 1) a removal of any relation makes the graph disconnected and 2) among all connected graphs, the minimal one optimizes the total relation sum, $$\sum_i r_i^2.$$

In some embodiments, blocks which are spaced by greater than a threshold normalized distance are not considered. In some embodiments, the number of relations that a block can participate in is limited to a maximum number R, e.g., 2 or 1 Where a block potentially has more than the threshold, the top R relations are therefore selected (e.g., those with the shortest Euclidian distance).

Querying Procedure

In the exemplary embodiment, the layout zone Z' is shifted across a document page D until the similarity over all pairs of block relation triples of the query zone Z and zone Z' of document D is optimized. By optimization, it is meant that the method need not necessarily identify the highest similarity, but attempts to approach, within a reasonable computation time, the highest similarity.

Figure 10:
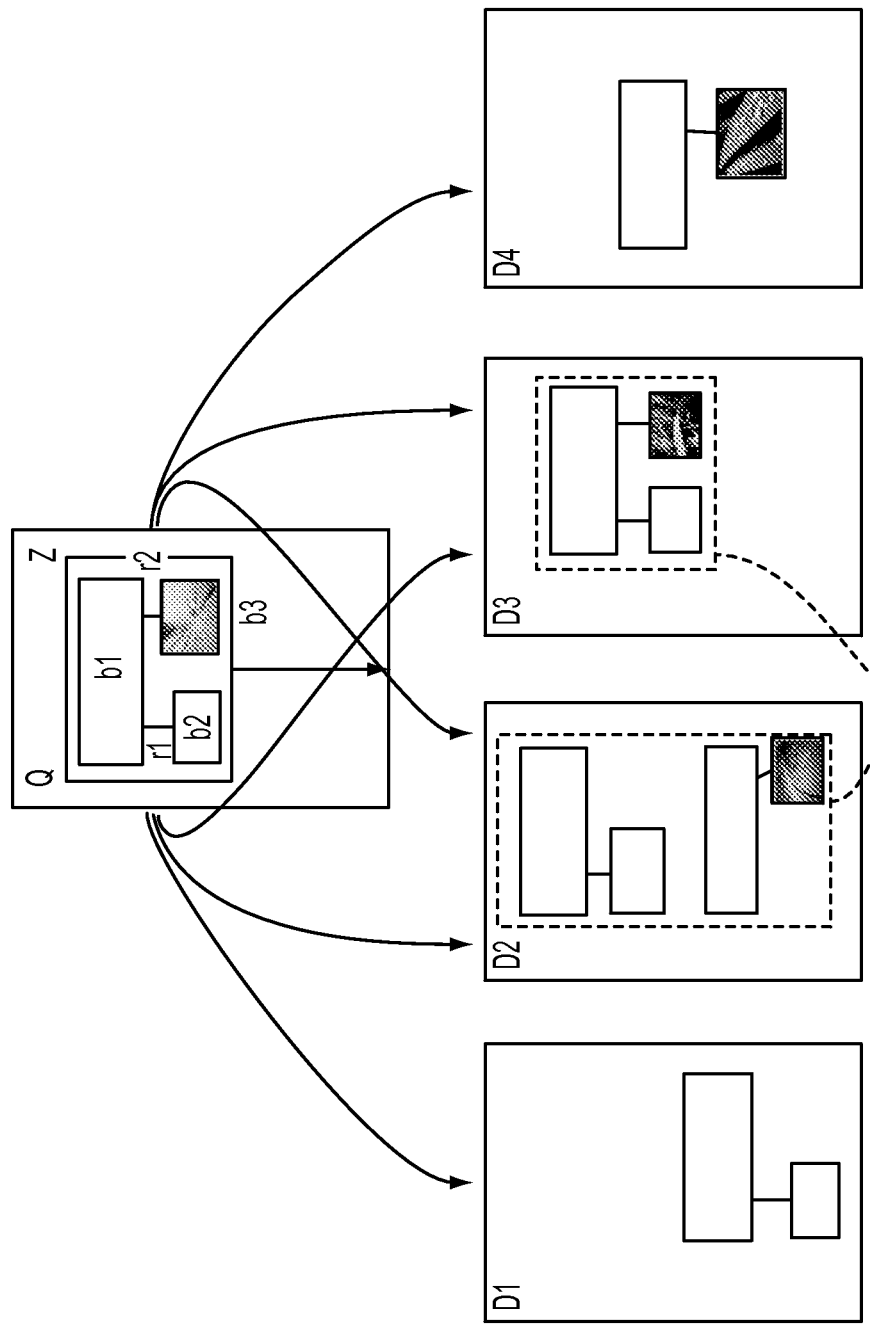
FIG. 10 graphically illustrates the comparison of two triples from a query document with triples in exemplary documents in the collection.

FIG. 10 illustrates the retrieval of similar document layouts by the block-and-relation querying procedure. In the query document Q, three blocks $b_1$, $b_2$, $b_3$ are extracted from the query zone Z and two relations $r_1,r_2$ between them (S210, S212). In this example $b_1$ and $b_2$ are text blocks with similar attributes, for convenience of illustration, and $b_3$ is an image block.

Then at S216, triples from the zone Z are queried in turn against the index 46 in which all the block-and-relation d-tuples for documents $D_1, D_2, \ldots$ have been stored in the preliminary step S112. For example, a first triple, such as the $(b^1, b_2, r_1)$-triple (i.e., a weighted $(t_{b1}, t_{b2}, r)$ d-tuple) is used to query the index. The neighbor querying retrieves and ranks 3 top triples located in documents $D_1$, $D_3$ and $D_2$ indicated by the corresponding arrows. The index 46 is then queried with a second triple, e.g., the $(b_1, b_3, r_2)$-triple. This query ranks 3 top triples in documents $D_3$, $D_2$ and $D_4$. An aggregation of the two rankings is performed (e.g., by adding or averaging the rankings). The overall ranking may also be based on other factors, such as a comparison of the zones Z, Z' For example, documents $D_2$ and $D_3$ both have a high rank aggregation. However, in the exemplary embodiment, $D_3$ is ranked higher because zone Z' in $D_3$ surrounding the matched blocks is closer in shape to the query zone Z. In the exemplary embodiment, this returns the final ranking of the documents, here: $D_3 > D_2 > D_1 > D_4$. In other embodiments, the ranking may take into account that both triples in Z have a first block $b_1$ in common and then penalize documents with no such pairs of triples.

The top k ranked documents are then retrieved. k may be any suitable number which the user may wish to retrieve and review. For example, 10, 20 or 50. The user may also select to return a larger document set if a smaller set does not prove useful.

As will appreciated, in the general case, more than two triples may be generated for a query zone, in which case, more than two rankings may be aggregated.

Where there are a large number of documents which are potentially responsive, querying may initially involve a screening out of documents which do not meet a threshold set of requirements. For example, if the query zone includes an image block, documents which lack an image block may be discarded. Similarly, if the query zone includes two or more text blocks, document pages with fewer than two text blocks may be discarded from further search.

An exemplary algorithm which summarizes the general querying procedure is given below.

---

Algorithm 2: Querying and retrieval with block-and-relation triples

Input: Index I of block-and-relation triples, weights $\alpha_i$
Input: query document Q with zone Z
Output: k documents with zones similar to Z in Q
1. Given the query document D and the query zone Z
2. Extract all blocks and their relations from the zone Z
3. for each triple $(b_1, b_2, r)$, i=1,...,m
4.    do
5.      Build a weighted tuple, d' = $\{\alpha_i d_i\}$, i=1,...,|d|
6.      Query the index I with d'
7.      Let $R_i$, be the ranked list of the top k neighbors of d'
8.    Od
9. Determine bounding zone Z' in each retrieved document D
10. Rank documents by their total ranks in $R_i$, i=1,...,m and zones Z'

---

2. Solving Location Problem by Zone Fitting

In this approach, zone fitting is used to address the sub-document querying. The location problem is defined as follows: given a query document (Q,Z) and an document D, find the "location" of Z in D. This method ignores the geometric relations between blocks (i.e., S110 and S212 are omitted), and thus a highly efficient processor is desired because of the large amounts of data to be processed. For example, using an image-query system such as that of Datta (Ritendra Datta, Dhiraj Joshi, Jia Li, and James Z. Wang. Image retrieval: Ideas, influences, and trends of the new age. ACM *Comput. Surv.*, 40(2):1-60, 2008), the location problem can be solved by using a overlapping rectangular partition of images. Using such partition, a precise localization of the sub-images that can be retrieved as matches for the user query. can be obtained. Problems appear, however, when the desired sub-image covers parts of two or more neighboring possible locations drawn by the grid. To overcome this problem the rectangles are often chosen to be overlapping.

For the exemplary layout querying, the location problem given a query (Q,Z) and a document D is to find a zone Z' in D that maximizes the similarity with zone Z, i.e., $\max_{\{Z'\}}$ similarity ((Q,Z), (D,Z'))

If the document D is not determined to be identical with respect to zones Z and Z', then the problem is to find k-top relevant documents D in the corpora S that maximizes the fitting function, $$\max_{\{D,Z'\}} \text{similarity}((Q,Z),(D,Z')).$$

Fit Function Maximization

For a block $b_1$ from the query (Q, Z) and block $b_2$ from document D, an overlap function may be used:

The geometric similarity between two blocks $b_1 = (p_{11}, p_{12})$ from a document layout $D^L$ and $b_2 = (p_{21}, p_{22})$ from the query zone Z may be defined as a ratio of the area of overlap of the two blocks, given by:

$$\text{over}(b_1, b_2) = 1 - 2 \times \text{area}(\text{overlap}(b_1, b_2))/(\text{area}(b_1) + \text{area}(b_2)),$$

where $\text{area}(p_1, p_2) = |x_1 - x_2| \times |y_1 - y_2|$.

This can be represented as a fitting function between two blocks. The fitting function $\text{Fit}(b_1, b_2)$ measures the match. It is factorized into the geometrical overlap $\text{over}(b_i, b_2)$ and a layout component, which does not depend on the block positions, as follows:

$$\text{Fit}(b_1, b_2) = \text{Fit}_{over}(b_1, b_2) \text{Fit}_{layout}(b_1, b_2)$$

Due to the rectangular nature of layout blocks, the geometrical overlap fit can be further factorized in a fit over the x axis and the fit over the y axis:

$$\text{Fit}_{over}(b_1, b_2) = \text{Over}(x) \times \text{Over}(y), \text{ where}$$

$$\text{Over}(x) = \max(0, \min(x_2, x_2') - \max(x_1, x_1'))$$

$$\text{Over}(y) = \max(0, \min(y_2, y_2') - \max(y_1, y_1')).$$

The optimal fit is achieved by finding a shift $(x_0, y_0)$ for the block $b_1$ that maximizes:

$$\max_{x_0, y_0} \text{Fit}(b_1 + (x_0, y_0), b_2) = \max_{x, y} \sigma \text{Fit}_{ov}(b_1 + (x_0, y_0), b_2)$$

where $\sigma = \text{Fitla}(b1, b2)$ is independent from the zone shift variable $(x_0, y_0)$.

Figure 11:
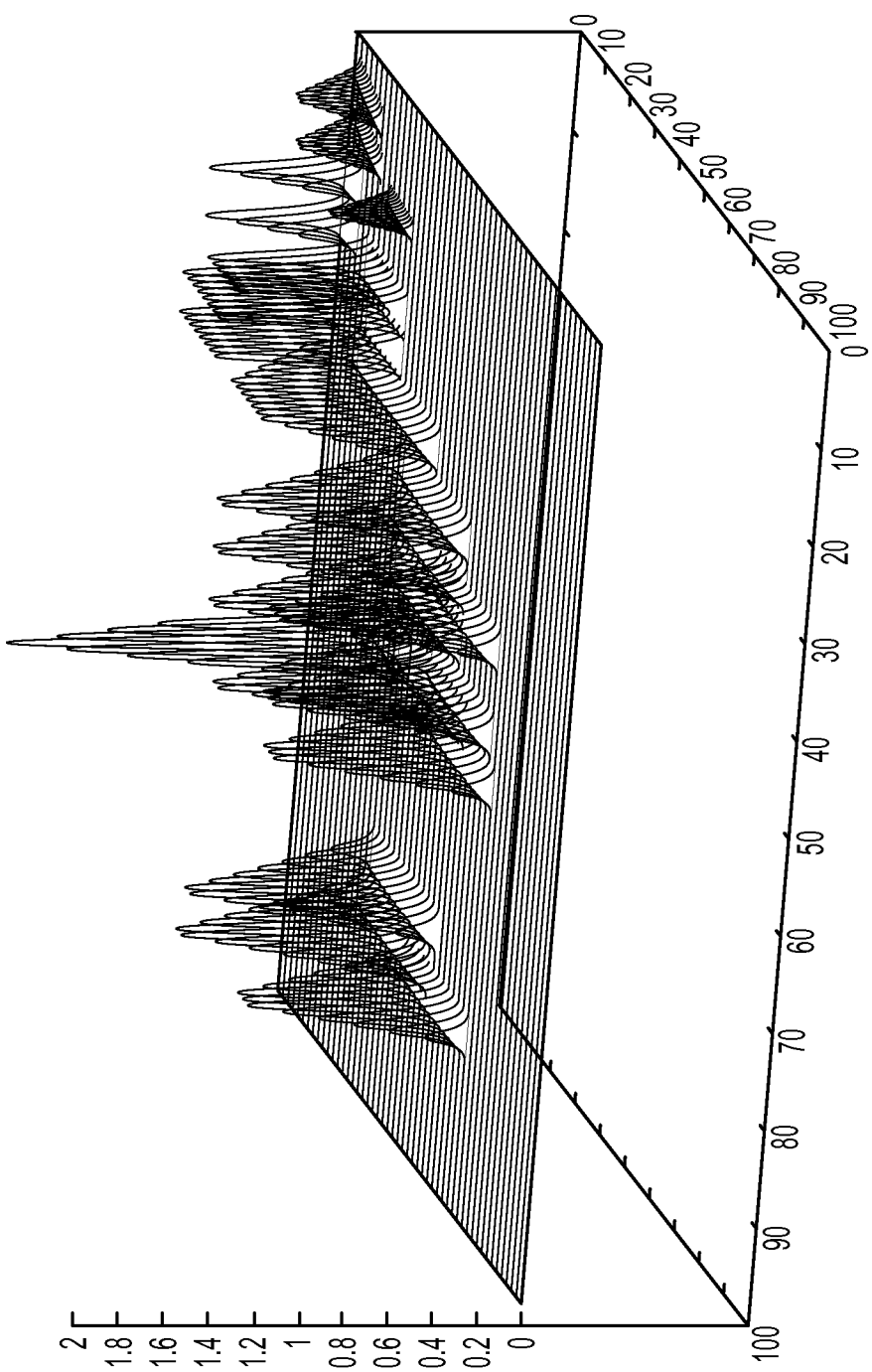
FIG. 11 illustrates a fit function for identifying similar documents in a collection.

If the query zone is composed of n blocks $Z = (b^q_1, \ldots, b^q_n)$ and document D is composed of m blocks, $D = (b_1, \ldots, b_m)$, the optimal fit can be achieved by maximizing the total ft function $\text{Fit}(Z, D) = \Sigma_{ij} \text{Fit}(b^q_i, b_j)$, as follows:

An exemplary fit function Fit(Z,D) is shown in FIG. 11. As can be seen, it is a non-convex, piecewise linear for the class of rectangular layout blocks. Using gradient descent techniques it will promptly converge to its (local) maximum (any one of the peaks shown). Due to the piece-wise linear nature, some modifications of the gradient descent technique can be used to converge to the global maximum (indicated by the highest peak). See for example, Croxton, Keely L., Gendron, Bernard and Magnanti, Thomas L., A Comparison of Mixed Integer Programming Models for Nonconvex Piecewise Linear Cost Minimization Problems, Manage. Science, 49(9), pp. 1268-1273 (2003).

The fitting function maximization is not scalable as it processes documents in a collection, one by one, to find the k top optimal fitting document pages. Thus, for large document collections, Method 1, described above, provides a faster approach.

The methods disclosed herein and illustrated in FIGS. 6 and 7 may be implemented in a computer program product that may be executed on a computer. The computer program product may be a non-transitory computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

The exemplary methods may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 6 and 7, can be used to implement the indexing and querying methods.

Without intending to limit the scope of the exemplary embodiments, the following example illustrates the zone-based querying method.

Example

A series of experiments were performed to test the described methods for zone-based layout querying of a document collection and ranking the relevant documents. Several publically available collections were used, including the ALCATEL and CPO collections. The system preprocesses and indexes all documents in a given collection, by applying Algorithm 1. For the evaluation, a sample of 10 query zones were selected from different documents in the collection to test the method. For each test zone, the top 10 documents in the collection were manually identified and ranked according to the visual similarity (see, e.g., the example query zone in FIG. 2 and two most relevant documents in FIG. 4).

In a preliminary evaluation, the relative block similarity with different weights $\alpha_i$ was used (Algorithm 2). 10 query documents were randomly take from each collection and the 10 top relevant documents manually annotated, with ratings from 1 to 10. Given the reference ranking for each query zone Z, the ranking functions were applied and the rank error measured as $\Sigma_i |\text{ref}(D_i) - \text{rank}(D_i)|$, where ref(D) and rank(D) are the position of document D in the reference ranking and method ranking, respectively. When the method ranking matches the reference one, the ranking error is therefore 0.

A second measure is the F1 function; it ignores the ranking orders and merely compares the set of 10 top retrieved documents with the 10-top reference documents using standard precision and recall measures. Here, precision represents the percentage of pages manual tagged as being in the top 10 that have been correctly tagged as in the top 10. Recall is the percentage of pages which should have been tagged as in the top 10 (based on the ground truth) which were in fact correctly tagged. The $F_1$ score can be a weighted average of the precision and recall, where an $F_1$ score has its best value at 100% and worst score at 0%.

In the evaluations, weight $a_i = 1$ was assigned for all block attributes and a factor B for the relation r, $\alpha = (1, \ldots, 1, B, B)$, where B=1, 2, 3, ....

For the triple storage, indexing and querying the Python R-tree package was used (available at http://pypi.python.org/pypi/Rtree/) which is very efficient on exact and neighbor searching.

Four different configurations for the document indexing and querying were tested as follows:

1. Fit function: the fitting method, with no indexing of triples.

2. Blocks only: which indexes blocks only of the layout, with no relations extracted nor stored.

3. Blocks+Rel: Extraction of block-and-relation triples with R top relations per block, where R=2, 3, 4.

4. Blocks+Rel CG: Extraction of block-and-relation triples using a connected relation graph (CG). According to this strategy, all blocks form a minimally connected graph. In other words, 1) a removal of any relation makes the graph disconnected and 2) among all connected graphs, the minimal one optimizes the total relation sum, $$\sum_i r_i^2.$$

Table 1 shows the evaluation results for two collections, ALCATEL and CPO. The average rank error and F1 measures are evaluated for the three configurations with different values of B and R. The average answer time in seconds is also shown.

TABLE 1

Evaluation of different indexing and retrieval methods

| Document collection Method | ALCATEL | | | CPO | | |
|---|---|---|---|---|---|---|
| | Rank error | F1(%) | Answer time (seconds) | Rank error | F1 (%) | Answer time (seconds) |
| 1. Fit function | 3.6 | 74.3 | 16.2 | 4.5 | 55.2 | 22.4 |
| 2. Blocks only | 8.1 | 23.6 | 1.3 | 8.9 | 11.6 | 1.6 |
| 3. Blocks + Rel R = 2, B = 1 | 5.2 | 58.2 | 1.0 | 6.4 | 36.5 | 1.4 |
| 3. Blocks + Rel R = 3, B = 1 | 4.3 | 61.8 | 1.2 | 6.3 | 40.9 | 1.5 |
| 3. Blocks + Rel R = 4, B = 1 | 4.6 | 63.7 | 1.3 | 6.3 | 41.7 | 1.7 |
| 3. Blocks + Rel R = 3, B = 2 | 4.2 | 63.8 | 1.6 | 5.9 | 43.2 | 1.9 |

TABLE 1-continued

Evaluation of different indexing and retrieval methods

| Document collection Method | ALCATEL | | | CPO | | |
|---|---|---|---|---|---|---|
| | Rank error | F1(%) | Answer time (seconds) | Rank error | F1 (%) | Answer time (seconds) |
| 4. Blocks + Rel CG, B = 1 | 3.6 | 72.6 | 2.5 | 5.7 | 56.9 | 3.1 |
| 4. Blocks + Rel CG, B = 2 | 3.8 | 73.8 | 3.6 | 5.6 | 56.9 | 4.9 |

The fitting function (method 1) works well. However, on these relatively large collections, the very low answer time is a penalty. Indexing by blocks and relations boosts the ranking performance over blocks only (method 2). Among the methods that combine blocks with relations, method 4, based on the connected relation graph, yields the better performance. However it is achieved at the cost of both longer document preprocessing/indexing and zone analysis. The generation of minimal connected graphs may thus not be suited to the online query environment, although it may find application where recall and precision are considered to be a priority.

The exemplary PYTHON prototype described in this example for the sub-document indexing and querying based on block and relation extraction is operational and scalable enough to process thousands and more queries online. It can be integrated in the document layout base interface described in U.S. application Ser. No. 12/556,098 or any other document management system, once the graphical facility is provided for the zone selection and querying.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for querying a document collection, comprising:
   providing an index for a collection of documents in which content of document pages in the collection that has been decomposed into blocks is indexed according to representations of the blocks and geometric relations between the blocks, including indexing each of the document pages as a set of triples, each triple comprising a block representation for each of a pair of the blocks and a geometric relation between the blocks in the pair, each geometric relation expressing the distance between blocks, in two orthogonal dimensions;
   receiving a query document page into memory;
   providing for a query zone to be identified within the query document page which has an area smaller than that of the document page;
   generating a query based on representations of blocks determined to be within the query zone and geometric relations between them, including generating at least one triple, each triple comprising a block representation for each of a pair of the blocks in the query zone and a geometric relation between the blocks in the pair; and
   querying the index with the generated query to identify similar pages of documents in the collection.

2. The method of claim 1, wherein at least one of the generating of the query and the querying of the index is performed with a computer processor.

3. The method of claim 1, wherein for each triple, at least one of the block representations and the geometric relation is assigned a weight.

4. The method of claim 1, wherein the querying comprises querying the index with each of the query zone triples and scoring document pages in the collection based on a measure of similarity between the query zone triples and triples of the document page.

5. The method of claim 4, wherein for each query zone triple, document pages are ranked based on the measure of similarity, and wherein the scoring of the document pages is based on an aggregate of the rankings.

6. The method of claim 4, wherein the scoring is also based on a comparison of at least one geometric feature of a layout zone with at least one geometric feature of the query zone, the layout zone bounding the triples of the document page most similar to those of the query zone.

7. The method of claim 1, wherein the block representations comprise tuples, each tuple comprising values for each of a set of attributes for a respective block.

8. The method of claim 7, wherein at least some of the attributes are selected from the group consisting of block type, block location, block dimensions, a normalized block ratio which favors horizontally extending blocks over vertically extending blocks, block alignment, font style, and combinations thereof.

9. The method of claim 1, wherein providing for a query zone to be identified within the query document page includes providing for a user to select the query zone.

10. The method of claim 1, wherein each geometric relation in the index is between no more than a pair of blocks and wherein no block is permitted to have more than a predetermined maximum number of geometric relations.

11. The method of claim 1, further comprising outputting a set of the documents in the collection that are determined to be responsive to the query.

12. The method of claim 11, wherein the outputting comprises displaying the responsive documents to a user.

13. The method of claim 1, wherein the query excludes triples comprising representations of blocks which are determined to be outside the query zone.

14. The method of claim 1, wherein querying the index with the generated query identifies pages of documents in the collection which have a layout zone which is similar, based on its block representations and geometric relations, to the query zone.

15. The method of claim 14, wherein the layout zone location and query zone location on the respective pages need not be congruent.

16. A computer program product comprising non-transitory memory storing instructions, which when executed by a computer, perform the method of claim 1.

17. A system comprising:
non-transitory memory storing instructions for performing the method of claim 1 and a processor in communication with the memory for executing the instructions.

18. The method of claim 1, wherein the providing for a query zone to be identified within the query document page includes identifying the query zone by a height and a width.

19. The method of claim 1, wherein the querying the index with the generated query includes translating a layout zone across a page of a document in the collection until a similarity over all pairs of block relation triples of the query zone and layout zone of document page is optimized.

20. A system comprising:
memory which stores an index for a document collection, the index comprising, for each of a set of document pages, a set of at least one triple, every triple comprising a respective representation for only two layout blocks extracted from the document page and a geometric relation between the two layout blocks, each geometric relation being based on a distance between the blocks of the respective pair;
instructions stored in memory for querying the index with a query zone query to identify similar document pages, the query zone query being based on at least one triple, each triple comprising a respective representation for only two layout blocks determined to be within a selected query zone within a query document page and a geometric relation between the two layout blocks; and
a processor in communication with the memory for executing the instructions.

21. The system of claim 20, wherein blocks within the query document page which are determined to be outside the query zone are not included in the query.

22. The system of claim 20, further comprising instructions for receiving a query zone selected by a user.

23. The system of claim 20, wherein the instructions for querying the index with the query zone query include instructions for translating a layout zone across a page of a document in the collection until a similarity over all pairs of triples of the query zone and layout zone of document page is optimized.

24. A method for indexing a document collection comprising:
receiving a collection of document pages to be indexed;
for each of the document pages:
decomposing the viewable content of the page into a set of layout blocks;
with a computer processor, generating a representation of each layout block which includes geometric attributes of the layout block;
storing triples in an index, each triple comprising a respective representation for each of a pair of the layout blocks and a geometric relation between only the two blocks in the pair of layout blocks, the geometric relation expressing the distance between the two blocks, in two orthogonal dimensions;
whereby the index is queryable based on at least one triple for a query zone of a query document.

25. A method for querying a document collection, comprising:
providing an index for a collection of documents in which content of document pages in the collection that has been decomposed into blocks is indexed according to representations of the blocks, the representations comprising block relation triples each block relation triple comprising a block representation for each of a pair of the blocks and a geometric relation between the blocks in the pair;
receiving a query document page into memory;
providing for a query zone to be identified within the query document page which has an area smaller than that of the document page by defining a height and a width of the query zone;
generating a query based on representations of blocks determined to be within the query zone; and
querying the index with the generated query to identify pages of documents in the collection which have a layout zone which is similar to the query zone, the layout zone having a height and a width, the querying including:
computing a similarity of a triple in the query zone with a block relation triple in a layout zone on a document page, and
translating the layout zone across a document page until the similarity over all pairs of block relation triples of the query zone and layout zone of document page is optimized.

* * * * *